(12) United States Patent
Maricevic et al.

(10) Patent No.: US 10,504,557 B2
(45) Date of Patent: Dec. 10, 2019

(54) DESIGNATING PARTIAL RECORDINGS AS PERSONALIZED MULTIMEDIA CLIPS

(71) Applicant: ARRIS Enterprises LLC, Suwanee, GA (US)

(72) Inventors: Zoran Maricevic, West Hartford, CT (US); John Ulm, Pepperell, MA (US); Jeethendra Poral, Bangalore (IN); Murali S. Sahasranaman, Bangalore (IN); Virendra Singh, Bangalore (IN); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/137,296

(22) Filed: Apr. 25, 2016

(65) Prior Publication Data

US 2016/0314817 A1    Oct. 27, 2016

Related U.S. Application Data

(60) Provisional application No. 62/152,384, filed on Apr. 24, 2015, provisional application No. 62/157,838, filed on May 6, 2015.

(51) Int. Cl.
*H04N 9/80* (2006.01)
*G11B 27/031* (2006.01)
(Continued)

(52) U.S. Cl.
CPC ............ *G11B 27/031* (2013.01); *G11B 27/28* (2013.01); *G11B 27/34* (2013.01);
(Continued)

(58) Field of Classification Search
CPC ............. H04N 9/80; H04N 5/93; G11B 27/00
(Continued)

(56) References Cited

U.S. PATENT DOCUMENTS

| 8,270,816 B2 * | 9/2012 | Mizushima | ............ H04N 5/772 386/239 |
| 2004/0205220 A1 * | 10/2004 | Nakamura | ......... H04N 21/4147 709/231 |

(Continued)

FOREIGN PATENT DOCUMENTS

WO    2011/138628 A1    11/2011

OTHER PUBLICATIONS

Examination Report, RE: European Application No. 16166662.3, dated Nov. 19, 2018.

*Primary Examiner* — Daquan Zhao
(74) *Attorney, Agent, or Firm* — Bart A. Perkins

(57) ABSTRACT

Methods, systems, and computer readable media may be operable to facilitate the creation of personalized partial recordings of multimedia content. A partial recording of a piece of content may be created based upon a user request being received at a multimedia device and a determination of partial recording start and termination points. In embodiments, the start point of a partial recording may be based upon a predetermined or user-input setback duration, or a preceding scene boundary may be identified as the partial recording start point. A partial recording may include a content preview comprising one or more portions of one or more content segments, and each of the one or more content segments may include a start point that is identified within the associated piece of content based upon a predetermined interval or an identification of scene boundaries within the content.

17 Claims, 10 Drawing Sheets

(51) Int. Cl.
| | |
|---|---|
| H04N 21/472 | (2011.01) |
| G11B 27/28 | (2006.01) |
| G11B 27/34 | (2006.01) |
| H04N 21/2343 | (2011.01) |
| H04N 21/274 | (2011.01) |
| H04N 21/4147 | (2011.01) |
| H04N 21/433 | (2011.01) |
| H04N 21/845 | (2011.01) |
| H04N 21/8549 | (2011.01) |
| H04N 21/854 | (2011.01) |
| H04N 5/93 | (2006.01) |
| G11B 27/00 | (2006.01) |

(52) U.S. Cl.
CPC ......... *H04N 21/23439* (2013.01); *H04N 21/234309* (2013.01); *H04N 21/274* (2013.01); *H04N 21/4147* (2013.01); *H04N 21/4334* (2013.01); *H04N 21/472* (2013.01); *H04N 21/8455* (2013.01); *H04N 21/8456* (2013.01); *H04N 21/854* (2013.01); *H04N 21/8549* (2013.01)

(58) Field of Classification Search
USPC ....... 386/241, 239, 248, 250, 278, 279, 282, 386/283, 284, 288
See application file for complete search history.

(56) References Cited

U.S. PATENT DOCUMENTS

| | | | |
|---|---|---|---|
| 2004/0240841 A1* | 12/2004 | Takagi | G11B 27/105 386/234 |
| 2006/0020966 A1* | 1/2006 | Poslinski | G09B 5/00 725/37 |
| 2007/0110395 A1* | 5/2007 | Ishida | G11B 20/10 389/279 |
| 2010/0296794 A1* | 11/2010 | Sato | H04N 5/782 386/250 |
| 2014/0219629 A1 | 8/2014 | McIntosh et al. | |

* cited by examiner

DESIGNATING PARTIAL RECORDINGS AS PERSONALIZED MULTIMEDIA CLIPS

CROSS REFERENCE TO RELATED APPLICATION

This application is a non-provisional application claiming the benefit of U.S. Provisional Application Ser. No. 62/152,384, entitled "Archiving Personalized Video Clips of Stored Media," which was filed on Apr. 24, 2015, and further claiming the benefit of U.S. Provisional Application Ser. No. 62/157,838, entitled "Selective Partial Recordings and Content Synchronization between Gateway and Client," which was filed on May 6, 2015." Both the U.S. Provisional Application Ser. No. 62/152,384 and the U.S. Provisional Application Ser. No. 62/157,838 are incorporated herein by reference in their entirety.

TECHNICAL FIELD

This disclosure relates to the designation and creation of partial recordings as personalized multimedia clips.

BACKGROUND

Recording capabilities of in-home devices such as a digital video recorder (DVR) have resulted in the storage of entire programs which are typically thirty minute or sixty minute segments, but some recorded programming may be several hours in length (e.g., movies, live events, sporting events, etc.). Current DVR interfaces require that the entirety of a program be recorded and stored at the DVR device. Thus, DVR storage capacity may quickly become scarce when several full-length pieces of content are recorded, and a user may be prevented from recording other programs of interest.

In some instances, a user might only be interested in one or more segments of a program (e.g., highlights, favorite scenes, etc.), and the user might desire that these one or more segments be permanently, or for at least an extended period of time, saved at a DVR device. The one or more segments may be only a fraction of the total length of the associated program. Moreover, using current DVR interfaces, playback of desired content segments is hampered as it requires searching through the rest of the piece of content using trickplay functions (e.g., fast-forward, rewind, skip, etc.) to get to the right location within the content.

With currently deployed DVR and set-top box (STB) technology, in order for a user to record a short video segment, the consumer typically has to be next to the DVR device or STB during a live transmission (or retransmission, if offered) and needs to press 'Record' and 'Stop' buttons located on the DVR device or STB precisely at the targeted start and stop points of the desired video segment. Besides the issue of requiring the user to be present to manually perform the recording, the user is further expected to have prior knowledge that an upcoming segment of the live content is going to be a segment that the user will want saved as an individual segment, which is problematic during a first viewing of the content.

It is commonplace that multimedia content is shared between multiple subscriber devices. For example, a central device such as a gateway device or set-top box may be configured to share multimedia content stored on the device with one or more companion devices including media players and mobile client devices such as a smart phone or tablet. Content that is recorded at a central device may be transcoded to a format that is compatible with one or more client devices, and the transcoded content may be transferred to one or more of the client devices. For example, a client device may be synchronized with a central device, wherein content stored at the central device is transferred to the client device for later consumption by a user.

Content selected for delivery to a client device may be conditioned (e.g., processed or transcoded) according to the playback attributes of a client device designated for receiving the content (e.g., mobile device, tablet, etc.). After the content is conditioned to suit the needs of the client device, the conditioned content may be transferred to the client device. Where both the central device and client device have wireless capabilities, the content may be transferred to the client device over a wireless network. The conditioning processes may be time consuming, depending on the quality and/or length of the content and may be carried out by the central device as background processes over an extended period of time. Moreover, one or more users may wish to condition a piece of content for delivery to a plurality of companion devices, and the content may have to be conditioned differently for each of the plurality of companion devices based on the playback and/or delivery requirements associated with the devices.

Some multimedia content like movie, show or sporting event recordings can be of such a size that it may take a large amount of time to synchronize the content to a companion device over a wireless connection (e.g., Wi-Fi). A user may benefit from the ability to have content automatically synchronized to a companion device. However, the synchronization process may be a lengthy one, and the companion device may be within range of the DVR device or associated access point for only a limited duration. Therefore, in an effort to reduce the time required to deliver content to a companion device, it is desirable to give the user an option to synchronize one or more segments of content to a companion device in order to allow the user to view segments of interest at the companion device and to make a determination whether to request synchronization of the entire piece of content.

Currently, DVR devices do not permit a user to create, organize, playback, or synchronize individual segments of content that are of interest to the user. Therefore, a need exists for methods and systems operable to facilitate an efficient creation of partial recordings of content.

BRIEF DESCRIPTION OF THE DRAWINGS

Like reference numbers and designations in the various drawings indicate like elements.

DETAILED DESCRIPTION

Figure 1:
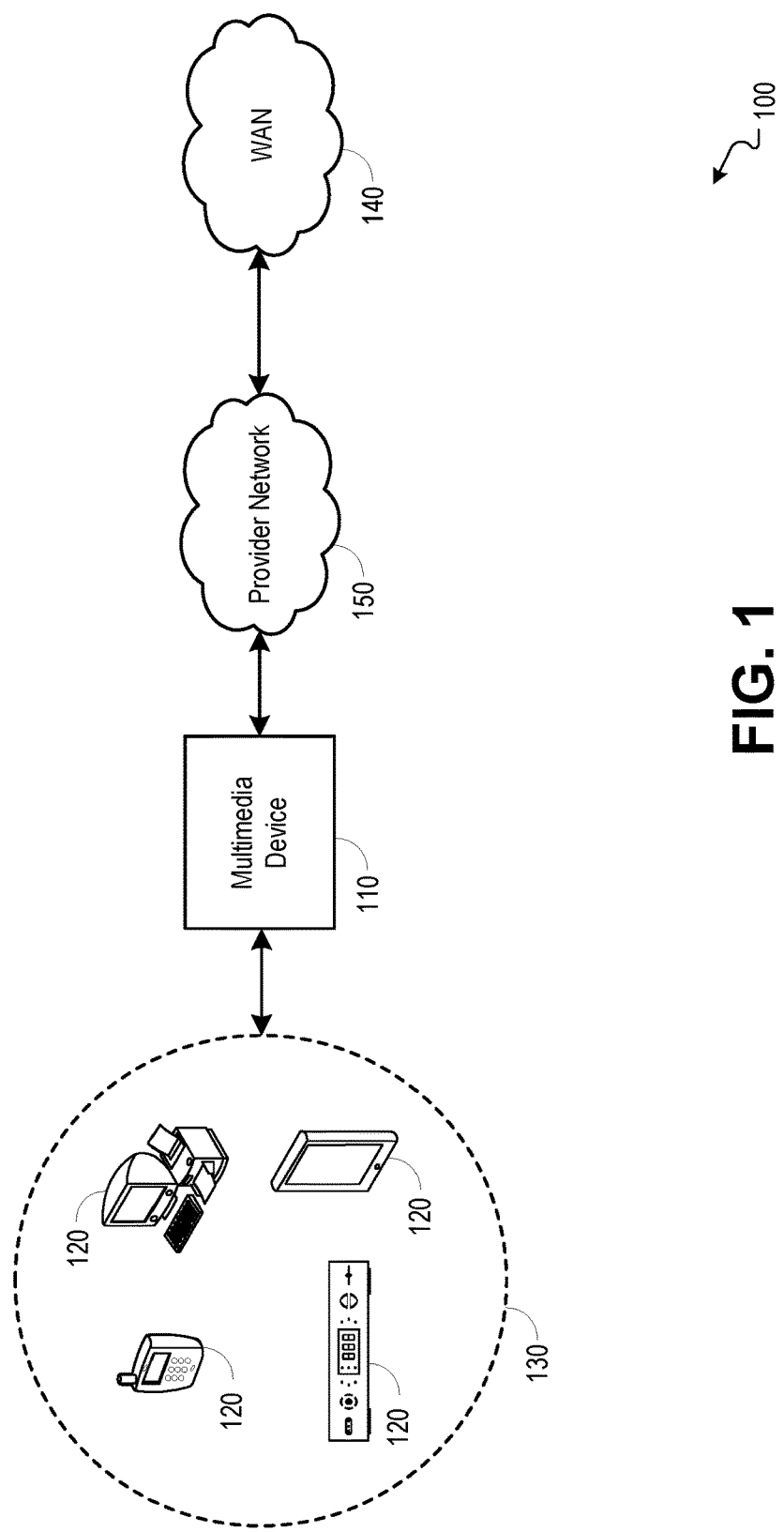
FIG. 1 is a block diagram illustrating an example network environment operable to facilitate the creation of personalized partial recordings of multimedia content.

It is desirable to provide methods and systems operable to facilitate an efficient creation of partial recordings. Methods, systems, and computer readable media may be operable to facilitate the creation of personalized partial recordings of multimedia content. A partial recording of a piece of content may be created based upon a user request being received at a multimedia device and a determination of partial recording start and termination points. In embodiments, the start point of a partial recording may be based upon a predetermined or user-input setback duration, or a preceding scene boundary may be identified as the partial recording start point. A partial recording may include a content preview comprising one or more portions of one or more content segments, and each of the one or more content segments may include a start point that is identified within the associated piece of content based upon a predetermined interval or an identification of scene boundaries within the content.

Methods, systems, and computer readable media described herein may facilitate the enhancement of digital video recorder (DVR) usage to record content that is being played back from a currently stored program, thereby making a copy for personal use of already stored content. In one example, this re-recording is carried out by leveraging existing DVR controls (e.g., record, stop, fast-forward, reverse, etc.), thereby allowing a portion of the program being viewed to be accurately copied. An improved user interface might also allow the user to rename the newly saved video segment. Additional user interface enhancements might allow the user to merge multiple video clips into a single archived video segment.

It should be understood that the methods, systems, and computer readable media described herein may work equally well with either in-home DVR or with network-based DVR (e.g., nDVR). Network DVR (nDVR) storage has the benefit of keeping these archived video segments in the cloud. In-home DVR may be supplemented with nDVR, thereby allowing these personalized archived video segments to be moved to cloud storage. This enables permanent storage, even if the in-home DVR is replaced.

The methods, systems and computer readable media described herein further provide the flexibility for a user to record only the scenes of interest within a program. This may enhance user experience during playback as the user need not perform any navigation to reach a favorite scene and may also help in saving the DVR disk space by not recording the scenes which are not of interest to a user.

In embodiments further described herein, a subscriber or premise may be provisioned with one or more companion devices to be associated with an in-home multimedia device such as a gateway or DVR. The one or more companion devices may make up a companion device group associated with the subscriber, premise and/or multimedia device. When recording a piece of multimedia content or when transcoding the content for on-the-go consumption, the multimedia device may mark one or more video scene transition points within the content. In embodiments, the multimedia device may logically offer portions of scenes associated with content in a directory which may be synchronized to one or more client devices. If the multimedia device does not have the capability to get or determine the scene boundaries, then the multimedia device may sample the content at predetermined time intervals and logically offer those portions in a standard way. For scheduled synchronizations or when the user wants to preview content on a companion device (e.g., to decide whether the user wants the full content without engaging the multimedia device), the multimedia device may synchronize to the companion device only the predefined beginning portions of the scenes or timed portions (i.e., sampled portions). The entirety of the content preview (i.e., the scene based content) to be synchronized can be set on the multimedia device or computed on the multimedia device such that scene portions are synchronized within a preset synchronization time. If the user has multiple companion devices, the multimedia device can send the beginning portions of alternate scenes/timed portions to another companion device. With the companion device having beginning portions of several scenes/timed portions or samples, the user on the client device can have a quick preview and request full synchronization of the content or certain full scenes of the piece of content from the multimedia device. In another embodiment, as the user watches the beginning of a scene, a client application on the client device can trigger the synchronization of remaining portions of the scene and can append existing scene data.

An embodiment of the invention described herein may include a method comprising: (a) receiving a request to create a partial recording of a piece of content; (b) identifying from within the piece of content, a start point for the partial recording; (c) identifying from within the piece of content, a termination point for the partial recording; and (d) copying the portion of the piece of content between the start point and the termination point as the partial recording.

According to an embodiment of the invention: (a) the piece of content comprises a recorded piece of content; (b) the request to create the partial recording is received during playback of the piece of content; and (c) the start point comprises the playback position of the piece of content as determined at the time at which the request is received.

According to an embodiment of the invention: (a) the request to create the partial recording is received during playback of the piece of content; (b) the start point comprises a point in the piece of content that is prior to the playback position of the piece of content as determined at the time at which the request is received; and (c) the start point is identified based upon an identified setback duration.

According to an embodiment of the invention, the identified setback duration comprises a duration of time that is received as input from a user.

According to an embodiment of the invention: (a) the request to create the partial recording is received during playback of the piece of content; and (b) the start point comprises a scene boundary preceding the playback position of the piece of content as determined at the time at which the request is received.

According to an embodiment of the invention, the scene boundary preceding the playback position of the piece of content as determined at the time at which the request is received is identified using a scene change detection algorithm.

According to an embodiment of the invention, the method described herein further comprises: (a) identifying one or more other start points within the piece of content, and for each respective one of the one or more other start points, identifying a corresponding termination point, thereby creating a plurality of partial recording segments, each respective partial recording segment comprising the portion of the piece of content between a respective start point and a respective termination point; and (b) consolidating the partial recording segments to create the partial recording.

According to an embodiment of the invention, each respective one of the plurality of start points comprises a scene boundary.

According to an embodiment of the invention, the method described herein further comprises: (a) conditioning the partial recording, wherein conditioning the partial recording comprises transcoding the partial recording to create a conditioned version of the partial recording that may be delivered to and processed for playback by a target client device; and (b) outputting the conditioned version of the partial recording to the target client device.

An embodiment of the invention described herein may include an apparatus comprising: (a) an interface configured to be used to receive a request to create a partial recording of a piece of content; and (b) one or more modules configured to: (i) identify from within the piece of content, a start point for the partial recording; (ii) identify from within the piece of content, a termination point for the partial recording; and (iii) copy the portion of the piece of content between the start point and the termination point as the partial recording.

According to an embodiment of the invention, the one or more modules are further configured to: (a) identify one or more other start points within the piece of content, wherein each respective one of the plurality of start points comprises a scene boundary, and for each respective one of the one or more other start points, identify a corresponding termination point, thereby creating a plurality of partial recording segments, each respective partial recording segment comprising the portion of the piece of content between a respective start point and a respective termination point; and (b) consolidate the partial recording segments to create the partial recording.

An embodiment of the invention described herein may include one or more non-transitory computer readable media having instructions operable to cause one or more processors to perform the operations comprising: (a) receiving a request to create a partial recording of a piece of content; (b) identifying from within the piece of content, a start point for the partial recording; (c) identifying from within the piece of content, a termination point for the partial recording; and (d) copying the portion of the piece of content between the start point and the termination point as the partial recording.

According to an embodiment of the invention, the instructions are further operable to cause one or more processors to perform the operations comprising: (a) identifying one or more other start points within the piece of content, and for each respective one of the one or more other start points, identifying a corresponding termination point, thereby creating a plurality of partial recording segments, each respective partial recording segment comprising the portion of the piece of content between a respective start point and a respective termination point; and (b) consolidating the partial recording segments to create the partial recording.

FIG. 1 is a block diagram illustrating an example network environment 100 operable to facilitate the creation of personalized partial recordings of multimedia content. In embodiments, a multimedia device 110 may be configured to provide multimedia services to one or more client devices 120. The multimedia device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network 130 (e.g., a local area network (LAN), a wireless local area network (WLAN), a personal area network (PAN), etc.). The multimedia device 110 may receive services from and may communicate with an upstream wide area network (WAN) 140 through a connection to a provider network 150. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), ZigBee etc.) may be used to deliver communications between a multimedia device 110 and client device 120.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120. The multimedia device 110 may carry out a data transfer or synchronization operation with an associated client device 120, wherein linear or stored content is wirelessly transferred to the client device 120. The multimedia device 110 may output content to a client device 120 when the content is requested, when the content has been conditioned and made available for delivery, or at a scheduled time.

In embodiments, a single piece of content may be requested from a multimedia device 110 for synchronization to a plurality of client devices 120, and each of the plurality of client devices 120 may have different transcoding and/or formatting requirements for the conditioning and/or delivery of the content. Therefore, the multimedia device 110 may prepare a single piece of content multiple times using different transcoding and/or formatting parameters for the conditioning of each version of the content. Conditioning of a content version suitable for delivery to and display at a client device 120 may include transcoding the content to a capability format associated with the client device 120, encrypting (e.g., digital rights management (DRM) encryption) the content to suit the client device 120, and others.

Depending on the size of the content and the availability of resources to the multimedia device 110, the conditioning and delivery of each version of the content may be a time-consuming process.

In embodiments, the multimedia device 110 may be configured to record and store one or more programs for later viewing by a user. During a subsequent playback of a recorded piece of content, the user may selectively edit and manage segments of the content for archiving.

In embodiments, trickplay controls (i.e., record, stop, fast-forward, reverse, etc.) associated with a multimedia device 110 or other display device (e.g., client device 120) may be used to create, edit, and/or manage segments of recorded content. For example, when recorded content is being played back at a display device and a predetermined button (e.g., a record button) is pressed at a control unit (e.g., remote control unit (RCU)), then a new recording of this content may be created starting at the current point in the program. After initiation of the new recording of recorded content, when a predetermined recording termination button (e.g., the stop button) is pressed, then the re-recording is terminated and all video between the record start point and stop point may be saved as a new partial recording. A user interface may optionally allow the user to rename the new recording at this point. In embodiments, after the partial recording is completed, a user may be given an option to delete the original program, and to only keep the partial recording, thereby increasing drive capacity for future recordings.

In embodiments, a multimedia device 110 may be configured to record and store previously captured segments of content received at the multimedia device 110 in response to a request received from a user. During playback of content (e.g., linear or live content) at a display device (e.g., display connected to the multimedia device 110 or client device 120 associated with the multimedia device 110), a user may initiate the capture of a partial recording starting at a previously received point in the content. For example, during playback of a piece of content, the user may press a special remote key (e.g., record or delayed record key) to record a past scene or segment of the content, and in response, the user may be prompted to input a time period over which to capture the past scene or segment. The user may enter a period of time (e.g., four, five, six minutes, etc.) over which the user wants to record the past portion of content as a partial recording of the content. Determination of the content segments for recording as a partial recording may include a calculation of the past live off disk (LOD) buffer offset based on a user specified time, a current time, a content bitrate, and/or a total LOD buffer size.

In embodiments, the multimedia device 110 may be configured with a default setback duration which will be used as the amount of time by which the multimedia device 110 goes back from a current position to begin recording a partial recording. Thus, a start point of the partial recording may be identified without further instructions from a user as to a setback duration. In embodiments, the partial recording may be copied from a LOD buffer used to temporarily store the received content, and the start point of the partial recording may be identified from the LOD buffer.

In embodiments, a piece of content received at a multimedia device 110 may be delineated according to a number of scene boundaries. For example, a received piece of content may have a plurality of scenes separated by one or more scene boundaries. During playback of content, a user may want to record a current scene as a partial recording. The user may initiate a partial recording of the scene by pressing a special remote key (e.g., record key, scene capture key, etc.). At that instance, the multimedia device 110 may be configured to identify the beginning point of the current scene (e.g., preceding scene boundary) and to record the complete scene from the identified beginning point. In embodiments, scene boundaries within a piece of content may be identified from meta-data associated with the content or may be identified by the multimedia device 110, or other device, using a scene change detection algorithm. The scene change detection algorithm may enable hardware scene change detection when the content is being played or recorded. For example, the beginning, end, and/or duration of a scene may be identified by determining the location of one or more scene changes within a piece of content.

In embodiments, the multimedia device 110 may prompt a user for input of a unique identifier for a captured partial recording. For example, the user may define a name for a partial recording while initiating the partial recording of the scene or segment. As another example, the user may define a name for a partial recording while playing back the partial recording. In embodiments, the multimedia device 110 may be configured with a pre-defined naming convention. For example, a name may be automatically assigned by the multimedia device 110 to a partial recording based upon a pre-defined convention (e.g., Scene1, Scene2 . . . etc.).

In embodiments, each of one or more partial recordings associated with the same piece of content may be organized and displayed as a single recording. For example, partial recordings of different scenes or segments from a piece of content may be stored at a multimedia device 110 and displayed within an interface to a user as a single recording.

In embodiments, the multimedia device 110 may output, through a display, an interface that allows a user to browse the partial recordings stored for a piece of content. When the user requests a display of a piece of content stored at the multimedia device 110, a menu displaying the available content may further include, for each respective piece of content, a number of partial recordings or scenes that were captured for the respective piece of content. Through the displayed menu, a user may request playback of a selected partial recording.

In embodiments, multiple client devices 120 (e.g., devices located in different locations of a subscriber premise) may share a single content storage device (e.g., DVR or other content storage). For example, multiple client devices 120 may be receiving the same piece of content from the same multimedia device 110 at the same time. A time-based or scene-based partial recording request may be received from each of the multiple client devices 120. These partial recordings may be recorded at the multimedia device 110 and may be identified or tagged with a unique identifier associated with the client device 120 that requested the partial recording. In embodiments, all of the partial recordings associated with a program may be stored and displayed as multiple, separate items or as a single recorded item. For example, the multimedia device 110 may create a master index for each recorded program, the master index containing an offset address for each partial recording associated with the recorded program. The master index may facilitate tracking and listing of the partial recordings as different entities in a hard disk for each client device 120.

In embodiments, multiple client devices 120 may be receiving different portions of the same piece of content from a common LOD buffer at a multimedia device 110. For example, a first client device 120 may be receiving segments of a first scene associated with a piece of content from an LOD buffer at the multimedia device 110 while a second client device 120 is receiving segments of a second scene associated with the piece of content from the LOD buffer at the multimedia device 110. If a partial recording is initiated by the first client device 120 during playback of the first scene and a partial recording is initiated by the second client device 120 during playback of the second scene, the multimedia device 110 may create a first partial recording that includes the first scene and a second partial recording that includes the second scene, wherein the first partial recording is marked with an identifier of the first client device 120 and the second partial recording is marked with an identifier of the second client device 120. The multimedia device 110 may tag the partial recordings with corresponding device identifiers before the content portions exit the LOD buffer.

In embodiments, when the multimedia device 110 receives a request for playback of a piece of content from a client device 120, the multimedia device 110 may output one or more partial recordings associated with the piece of content to the requesting client device 120. The partial recordings output to the requesting client device 120 may include all of the partial recordings that are both associated with the piece of content and recorded in response to a request received from the client device 120. The partial recordings output to the requesting client device 120 may include all of the partial recordings that are both associated with the piece of content and recorded in response to a request received from another, identified client device 120. It should be understood that the client device 120 may request one or more individual partial recordings associated with a piece of content for output or synchronization to the client device 120.

In embodiments, one or more client devices 120 may be associated with a multimedia device 110 as companion devices. The one or more companion devices may make up a companion device group associated with a subscriber or multimedia device 110, and the multimedia device 110 may be configured with a list including identifiers of each of the companion devices and an order of companionship.

When recording multimedia content or when transcoding the content for synchronization to a client device 120, the multimedia device 110 may mark one or more scene transition points or scene boundaries within the content. It will be appreciated by those skilled in the relevant art that various techniques may be used to enable hardware scene change detection when a piece of content is being recorded, transcoded or played. For content that is being recorded as it is also being played, a firmware implementation can create scene meta-data that may assist in the identification of scene transition points. For content that is only recorded and not played at the time of recording, a firmware implementation can create scene meta-data at a later stage, for example when the recorded content is played for the first time or when getting transcoded. The scene meta-data created on a per content basis may contain a starting frame offset for each scene along with the duration of the scene. Thereby, the scene meta-data may aide in fetching to necessary offsets within the content when the previewed content is being fetched by a companion device.

In embodiments, the multimedia device 110 may logically offer portions of scenes as content in a directory which can be synced to one or more client devices 120. For example, the directory may be implemented as a standard Digital Living Network Alliance (DLNA) content directory service (CDS) entry.

In embodiments, if the multimedia device 110 does not have the capability to get/determine the scene boundaries of a piece of content, then the multimedia device 110 may sample the piece of content at predetermined time intervals and logically offer those portions in a directory created for that content. For example, a piece of content may be sampled at different time intervals, and each sampling may have a duration such that a combination of the samplings has a total duration equivalent to or less than a predetermined maximum preview duration (e.g., one, two, three minutes, etc.).

For scheduled synchronizations or when a user wants to preview a piece of content on a client device 120 (e.g., to decide if the user wants the full content without engaging the multimedia device 110), the multimedia device 110 can synchronize to the client device 120 only the predefined beginning portions of the scenes or content segments (i.e., segments sampled at predetermined time intervals) associated with the piece of content.

In embodiments, a multimedia device 110 may be configured to create a content preview that is sized according to a predetermined scene preview synchronization time (e.g., one, two, three minute preview, etc.). If a user has multiple companion devices, the multimedia device 110 may only send the beginning portions of alternate scenes or segments to another device.

In embodiments, the multimedia device 110 may synchronize a recording preview (e.g., consolidation of one or more scene or segment portions associated with a piece of content recorded at the multimedia device 110) based on video meta-data which matches with companion device user preferences. According to user preferences, different companion devices may receive content notifications differently.

With the companion device having beginning portions of several scenes or time sampled portions, a user of the companion device may view a preview of the subject content and, after viewing the preview, the user may request from the multimedia device 110 a synchronization of the entirety of the subject content or certain scenes of the subject content. For example, a user, through a client device 120, may request certain full scenes or time segments from the multimedia device 110 by accessing a directory wherein the scenes or portions are published as separate files. In embodiments, during playback of the beginning of a scene or a timed portion at a client device 120, a client application on the client device 120 may trigger the multimedia device 110 to transcode and synchronize the remaining portions of the scene and append the existing content data associated with the scene or portion on the client device.

It should be understood that the multimedia device 110 may use whatever resources that are available to the device, and that are not being used for other processes, to condition a content preview or entire piece of content for delivery to a client device 120. It should be further understood that the multimedia device 110 may create a plurality of conditioned versions of the content preview by conditioning the content preview using different formatting, transcoding, delivery, and/or playback parameters associated with each of a plurality of client devices 120 anticipated as being likely to request synchronization of the content preview.

In embodiments, the multimedia device 110 may output a notification to a client device 120 for which a content preview has been conditioned. For example, when the multimedia device 110 has conditioned a content preview for delivery to a client device 120, the multimedia device 110 may output a notification to the client device 120 that the conditioned content preview is available for synchronization to the client device 120. The multimedia device 110 may be configured to automatically begin a wireless or wired delivery of the conditioned content preview to one or more client devices 120 if the one or more client devices 120 are connected to or otherwise associated with the multimedia device 110 (e.g., if the client devices 120 are within a wireless range associated with the multimedia device 110), or the multimedia device 110 may be configured to require confirmation from the client device 120 before beginning a delivery of the conditioned content preview to the client device 120. The notification may provide a subscriber with the option to request delivery of the conditioned content preview to the client device 120. It should be understood that the notification may include other information such as an identification of the availability of other content at the multimedia device 110 that has been conditioned and is suitable for delivery to the client device 120, various details associated with the conditioned content preview, and others.

Figure 2:
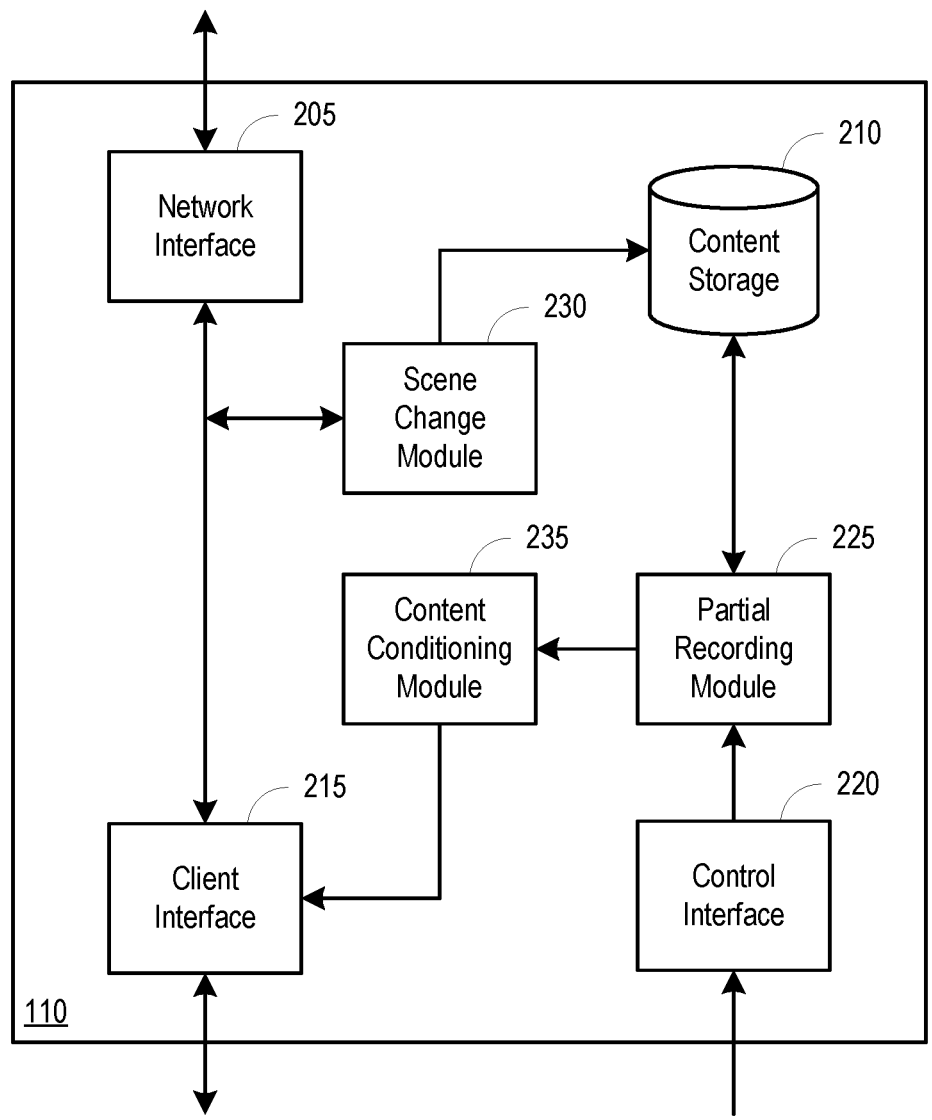
FIG. 2 is a block diagram illustrating an example multimedia device operable to facilitate the creation of personalized partial recordings of multimedia content.

FIG. 2 is a block diagram illustrating an example multimedia device 110 operable to facilitate the creation of personalized partial recordings of multimedia content. The multimedia device 110 may include a network interface 205, content storage 210, a client interface 215, a control interface 220, a partial recording module 225, a scene change module 230, and a content conditioning module 235. The multimedia device 110 may include a multimedia or residential gateway, a set-top box (STB), or any other device configured to receive, store, and/or deliver multimedia content to one or more client devices 120 of FIG. 1.

In embodiments, the multimedia device 110 may communicate with one or more client devices 120 over a wired or a wireless connection through the client interface 215. The multimedia device 110 may output content and/or other services to client devices 120 through the client interface 215 and may receive requests for content and/or other upstream communications through the client interface 215. It should be understood that the client interface 215 may include various wired and/or wireless interfaces using various protocols and/or standards (e.g., Wi-Fi, multimedia over coax alliance (MoCA), ZigBee, Ethernet, etc.) may be used to deliver communications between a multimedia device 110 and client device(s) 120. For example, the multimedia device 110 may communicate with one or more client devices 120 over a local network 130 of FIG. 1.

In embodiments, content may be received at the multimedia device 110 from an upstream network (e.g., provider network 150 of FIG. 1, WAN 140 of FIG. 1, etc.) through the network interface 205. Communications and services received through the network interface 205 may forwarded to one or more client devices 120 through the client interface 215. For example, content streams (e.g., live or linear content, VoD content, recorded content, etc.) may be recorded by the multimedia device 110 and stored at content storage 210, and/or the content streams may be forwarded to one or more client devices 120 through the client interface 215. The multimedia device 110 may include one or more live off disk (LOD) buffers (e.g., at content storage 210), and content streams received at the multimedia device 110 may be temporarily stored or buffered within the LOD buffer(s).

In embodiments, the output of content (e.g., both recorded and linear content) may be controlled by user requests received from a control device (e.g., RCU) through the control interface 220. For example, a user may view available content through a menu displayed at a display device, and may select content for delivery from the multimedia device 110 to a client device 120. The user may control playback and recording functions at the multimedia device 110 using various buttons at a control device (e.g., record, play, fast-forward, rewind, skip, and other trickplay controls).

In embodiments, the partial recording module 225 may create partial recordings of content received and/or stored at the multimedia device 110. The partial recording module 225 may create a partial recording in response to a partial recording request received from a control device or client device 120 through the control interface 220 or client interface 215. For example, during playback of a recorded piece of content, if a recording request is received through the control interface 220 from a control device, the partial recording module 225 may initiate a copying of the recorded content from the point at which the request was received, and the copying may continue for a predetermined duration or until a stop recording request is received from the control device. As an example, the recording request may be transmitted from a control device when a record button, or other button having a similar function, is depressed at the control device, and the stop recording request may be transmitted from the control device when a stop button, or other button having a similar function, is depressed at the control device.

When a request for a partial recording is received at a multimedia device 110, the partial recording module 225 may identify a partial recording start point within the content being delivered to a requesting client device 120. The start point may be the current position being delivered to the client device 120 when the request is received, or the start point may be a prior position within the content. For example, the partial recording module 225 may identify a start point at a prior position within the content based upon either a predetermined or user-input set-back duration or the identification of a preceding scene boundary. The termination point for the partial recording may then be determined based upon a predetermined or user-input recording duration or the identification of a next scene boundary.

The partial recording module 225 may identify scene boundaries within a piece of content based on meta-data that is included within the content. The meta-data may identify transitions between scenes and may be included within the content as the content is received at the multimedia device 110 or may be added to the content by the scene change module 230. In embodiments, the scene change module 230 may be configured with a scene change algorithm operable to identify a transition within a piece of content from one scene to another, and the scene change module 230 may mark the transition points within the content.

In embodiments, the partial recording module 225 may generate content previews associated with one or more pieces of content stored at content storage 210. The partial recording module 225 may identify recordings for which to create content previews based upon user-input or a predictive algorithm (e.g., based on an observance of the content and type of content requested for synchronization to one or more associated client devices 120). The partial recording module 225 may identify one or more segment start points (e.g., based on either a predetermined interval or an identification of scene boundaries) within the recorded content, and the partial recording module 225 may copy or record segments from each identified start point, wherein each segment is of a predetermined duration. The one or more segments copied or recorded for a piece of content may be consolidated and stored as a content preview, and the partial recording module 225 may initiate a synchronization of the content preview to one or more client devices 120.

In embodiments, a content conditioning module 235 may condition a partial recording for delivery to one or more client devices 120. The content conditioning module 235 may condition live or linear content received at the multimedia device 110 and/or content that is stored at the content storage 210 (e.g., recordings or partial recordings). For example, the content conditioning module 235 may condition a piece of content to create a conditioned version of the content that is compatible with one or more targeted client devices 120. Conditioning of a content version suitable for delivery to and display at a client device 120 may include transcoding the content to a capability format associated with the client device 120, encrypting (e.g., digital rights management (DRM) encryption) the content to suit the client device 120, and others. The content conditioning module 235 may output conditioned content to a targeted client device 120 through the client interface 215 as a data transfer or synchronization operation. The content conditioning module 235 may output content to a client device 120 when the content is requested, when the content has been conditioned and made available for delivery, or at a scheduled time.

In embodiments, the content conditioning module 235 may output, through the client interface 215, a notification to a device for which a piece of content has been conditioned. For example, when the content conditioning module 235 has conditioned a piece of content for delivery to a client device 120, the content conditioning module 235 may output a notification informing the client device 120 that the conditioned piece of content is available for synchronization to the client device 120. The content conditioning module 235 may be configured to automatically begin a wireless or wired delivery of the conditioned content to the client device 120 if the client device 120 is connected to or otherwise associated with the multimedia device 110 (e.g., if the client device 120 is within a wireless range associated with the multimedia device 110), or the content conditioning module 235 may be configured to require confirmation from the client device 120 before beginning a delivery of the conditioned content to the client device 120. It should be understood that the notification may include other information such as an identification of the availability of other content within the content storage 210 that has been conditioned and is suitable for delivery to the client device 120, various details associated with the conditioned piece of content, and others.

Figure 3:
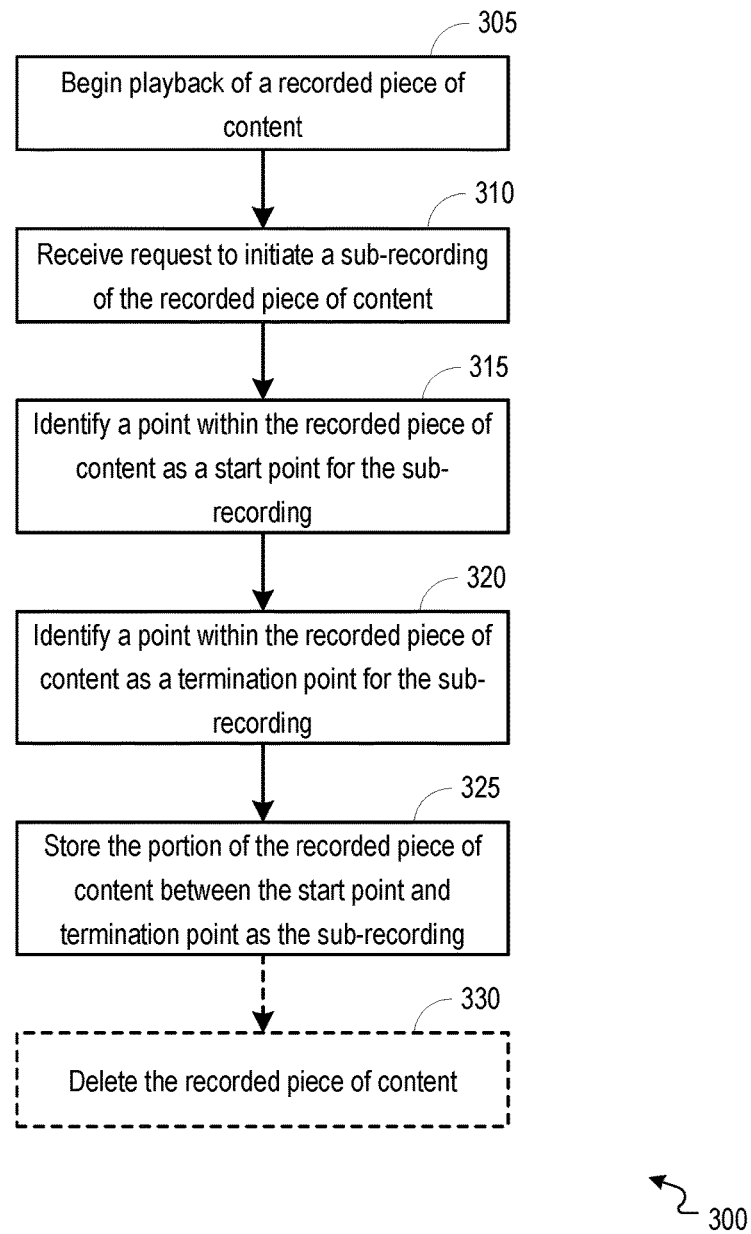
FIG. 3 is a flowchart illustrating an example process operable to facilitate the creation of a personalized partial recording.

FIG. 3 is a flowchart illustrating an example process 300 operable to facilitate the creation of a personalized partial recording. The process 300 may begin at 305 when playback of a recorded piece of content is initiated. The recorded piece of content may be stored at a multimedia device 110 of FIG. 1 (e.g., at content storage 210 of FIG. 2), and playback of the recorded piece of content may be initiated by a playback request received from a display device connected to or otherwise associated with the multimedia device 110 (e.g., client device 120 of FIG. 1).

At 310, a request to initiate a sub-recording of the recorded piece of content may be received. The request to initiate a sub-recording of the content may be received at the multimedia device 110 (e.g., at a partial recording module 225 of FIG. 2). In embodiments, the request to initiate a sub-recording may include a signal received at the multimedia device 110 from a control unit (e.g., remote control unit (RCU)). For example, while outputting a piece of recorded content to a device, the multimedia device 110 (e.g., the partial recording module 225) may recognize a predetermined command (e.g., 'Record' command transmitted from a RCU in response to a depressing of a 'Record' button) as a request to initiate a sub-recording.

At 315, a point within the recorded piece of content may be identified as a start point for the sub-recording. The start point may be identified, for example, by the partial recording module 225. In embodiments, when a request for initiation of a sub-recording is recognized, the partial recording module 225 may mark a current read position within the recorded piece of content. When a request for initiation of a sub-recording is recognized, the partial recording module 210 may initiate a sub-recording of the recorded piece of content as the content is being output for playback, and the sub-recording may begin from the point within the recorded piece of content being output by the multimedia device 110 when the request for initiation of the sub-recording is received or recognized by the multimedia device 110.

At 320, a point within the recorded piece of content may be identified as a termination point for the sub-recording. The termination point may be identified, for example, by the partial recording module 225. In embodiments, the termination point may be identified based on a predetermined, default, or user-input sub-recording duration or may be based upon the timing of a request for termination of the sub-recording received from a control unit (e.g., RCU). For example, during output of the recorded piece of content for playback, and while recording a sub-recording of the piece of content, the multimedia device 110 (e.g., the partial recording module 225) may recognize a predetermined command (e.g., 'Stop' command transmitted from a RCU in response to a depressing of a 'Stop' button) as a request to terminate the sub-recording. As another example, the multimedia device 110 may be configured with a default sub-recording duration or the user may input a sub-recording duration, and the multimedia device 110 may identify the termination point as a point within the recorded piece of content occurring a period of time after the start point, the period of time being equivalent to the sub-recording duration. The multimedia device 110 (e.g., the partial recording module 225) may mark the identified termination point within the recorded piece of content or may terminate the recording of the sub-recording.

At 325, the portion of the recorded piece of content between the start point and the termination point may be stored as the sub-recording. The portion of the recorded piece of content between the start point and the termination point may be stored, for example, at the content storage 210 of FIG. 2. The sub-recording may be stored at the content storage 210 as a recording that is separate from the original recorded piece of content. The sub-recording may be recorded while the portion of the recorded piece of content making up the sub-recording is output by the multimedia device 110 for playback or may be recorded and stored after playback of the recorded piece of content. For example, after or during playback of the recorded piece of content, the partial recording module 225 may initiate a recording or copy operation of the recorded piece of content at the point identified as the start point for the sub-recording and may continue the recording or copy operation until the point identified as the termination point for the sub-recording is reached. In embodiments, the sub-recording may be stored as an identification of the start point and the termination point. For example, the start point and termination point may be stored at the content storage 210, and when playback or delivery of the sub-recording is requested, the multimedia device may initiate playback/delivery of the original recorded piece of content at the identified start point and may end playback/delivery at the termination point.

At 330, the original recorded piece of content may optionally be deleted. In embodiments, the multimedia device 110 may be configured to automatically delete the original recorded piece of content after a recording and storage of a sub-recording associated with the original recorded piece of content, or a user may be presented with an option to delete the original recorded piece of content after the recording and storage of a sub-recording associated with the original recorded piece of content. If a default deletion of the content is to occur, or if the multimedia device 110 is otherwise instructed to delete the original recorded piece of content, the original recorded piece of content may be deleted from the content storage 210 after the sub-recording has been recorded and stored.

Figure 4:
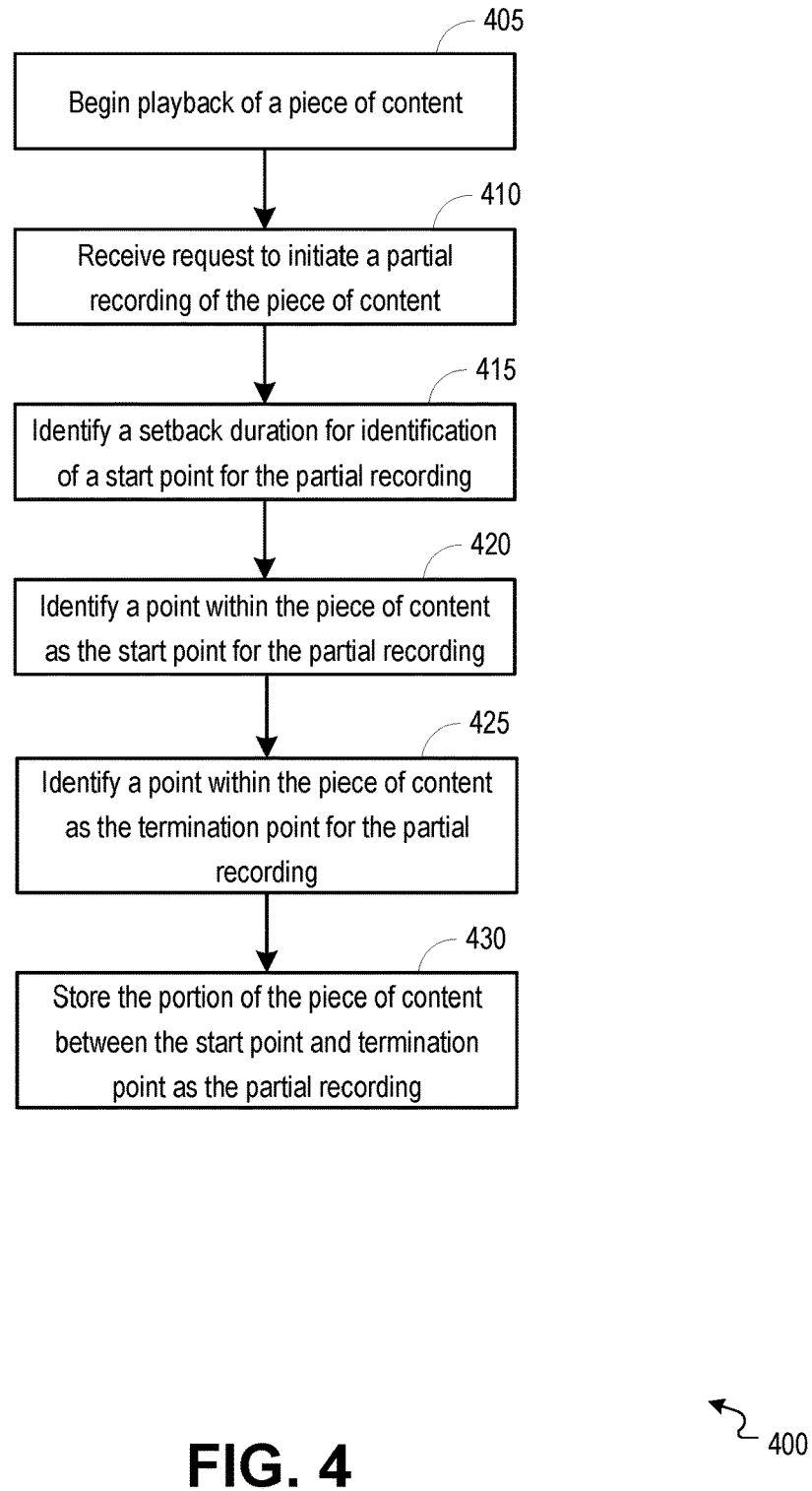
FIG. 4 is a flowchart illustrating an example process operable to facilitate the creation of a personalized partial recording including a segment of previously viewed content.

FIG. 4 is a flowchart illustrating an example process 400 operable to facilitate the creation of a personalized partial recording including a segment of previously viewed content. The process 400 may begin at 405 when playback of a piece of content is initiated. The piece of content may be linear multimedia content (e.g., live television) received at a multimedia device 110 of FIG. 1, recorded multimedia content received at the multimedia device 110 (e.g., VoD content, nDVR content, etc.), or recorded multimedia content stored at the multimedia device 110 (e.g., DVR content stored at content storage 210 of FIG. 2), and playback of the piece of content may be initiated by a playback request received from a display device connected to or otherwise associated with the multimedia device 110 (e.g., client device 120 of FIG. 1).

At 410, a request to initiate a partial recording of the piece of content may be received. The request to initiate a partial recording of the content may be received at the multimedia device 110 (e.g., at a partial recording module 225 of FIG. 2). In embodiments, the request to initiate a partial recording may include a signal received at the multimedia device 110 from a control unit (e.g., remote control unit (RCU)). For example, while outputting a piece of content to a device, the multimedia device 110 (e.g., the partial recording module 225) may recognize a predetermined command as a request to initiate a partial recording. The predetermined command may be transmitted from a RCU in response to a depressing of a button designated for the initiation of a partial recording. The button designated for the initiation of a partial recording may be a unique button (e.g., 'Partial Recording' button) or may be a button having one or more other functions (e.g., a 'Record' button).

At 415, a setback duration for use in the identification of a start point for the partial recording may be identified. A setback duration may be identified, for example, by a partial recording module 225 of FIG. 2. In embodiments, a multimedia device 110 may be configured with a default setback duration (e.g., 5, 6, 7 minutes, etc.), or a user may select a setback duration or enter a custom setback duration for use in identifying a start point for the partial recording. For example, when a request to initiate a partial recording is received at a multimedia device 110, a user may be prompted (e.g., through a client device 120 of FIG. 1) to input a desired setback duration or to select a setback duration from a plurality of setback duration options. A user-input setback duration may be received at a multimedia device 110 (e.g., at a partial recording module 225 of FIG. 2) along with or subsequent to the reception of a corresponding request to initiate a partial recording.

At 420, a point within the piece of content may be identified as a start point for the partial recording. The start point may be identified, for example, by the partial recording module 225. In embodiments, the start point for the partial recording may be identified based upon the identified setback duration. As the piece of content is output by the multimedia device 110 for playback, the piece of content may be recorded or temporarily stored (e.g., at content storage 210 of FIG. 2). For example, segments of the piece of content may be stored at one or more buffers (e.g., live off disk (LOD) buffers). When a request for initiation of a partial recording is received, the partial recording module 225 may identify as a start point for the partial recording, a point occurring within the recorded or stored piece of content a certain duration of time before the point of the piece of content that is output from the multimedia device 110 for output at the time at which the request for initiating the partial recording is received, wherein the certain duration of time is equivalent to the identified setback duration.

At 425, a point within the piece of content may be identified as a termination point for the partial recording. The termination point may be identified, for example, by the partial recording module 225. Identification of the termination point may be made based upon a default configuration of the partial recording module 225 or input received from a user.

In embodiments, the termination point may be identified based on a predetermined, default, or user-input partial recording duration, the timing of the request for initiation of the partial recording, the timing of a request for termination of the partial recording, or the duration of the piece of content. For example, the partial recording module 225 may identify the point in the piece of content at which the request for initiating the partial recording was received or recognized as the termination point for the partial recording. As another example, during output of the piece of content for playback, the multimedia device 110 (e.g., the partial recording module 225) may recognize a predetermined command (e.g., 'Stop' command transmitted from a RCU in response to a depressing of a 'Stop' button) as a request to terminate the partial recording. In response to the recognition of the predetermined command, the partial recording module 225 may mark the current point or newest point in a corresponding buffer or recording as the termination point for the partial recording. As yet another example, the multimedia device 110 may be configured with a default partial recording duration or the user may input a partial recording duration (e.g., 5 minutes, 10 minutes, remaining duration of the piece of content, etc.), and the multimedia device 110 may identify the termination point as a point within the piece of content occurring a period of time after the start point, the period of time being equivalent to the partial recording duration. When the point in the piece of content identified as the termination point of the partial recording is received at the multimedia device 110, the partial recording module 225 may mark the identified termination point within a buffer or recording of the content or may terminate the recording of the partial recording.

At 430, the portion of the piece of content between the start point and the termination point may be stored as the partial recording. The portion of the piece of content between the start point and the termination point may be stored, for example, at the content storage 210 of FIG. 2. The partial recording may be stored at the content storage 210 as a recording that is separate from the original piece of content. In embodiments, the partial recording module 225 may perform a recording or copy operation on one or more portions of the piece of content that are temporarily stored at one or more buffers (e.g., LOD buffers). The portions of the piece of content identified for storing as the partial recording may be copied from the one or more buffers to content storage 210 and may be stored as a scene associated with the original piece of content. The stored partial recording may include other information associated with the partial recording (e.g., information identifying the associated original piece of content, duration information, start and termination points, date/time of creation, etc.) and/or a device responsible for creating the partial recording. For example, the recording may include an identifier of the client device 120 that requested an initiation of the partial recording.

Figure 5:
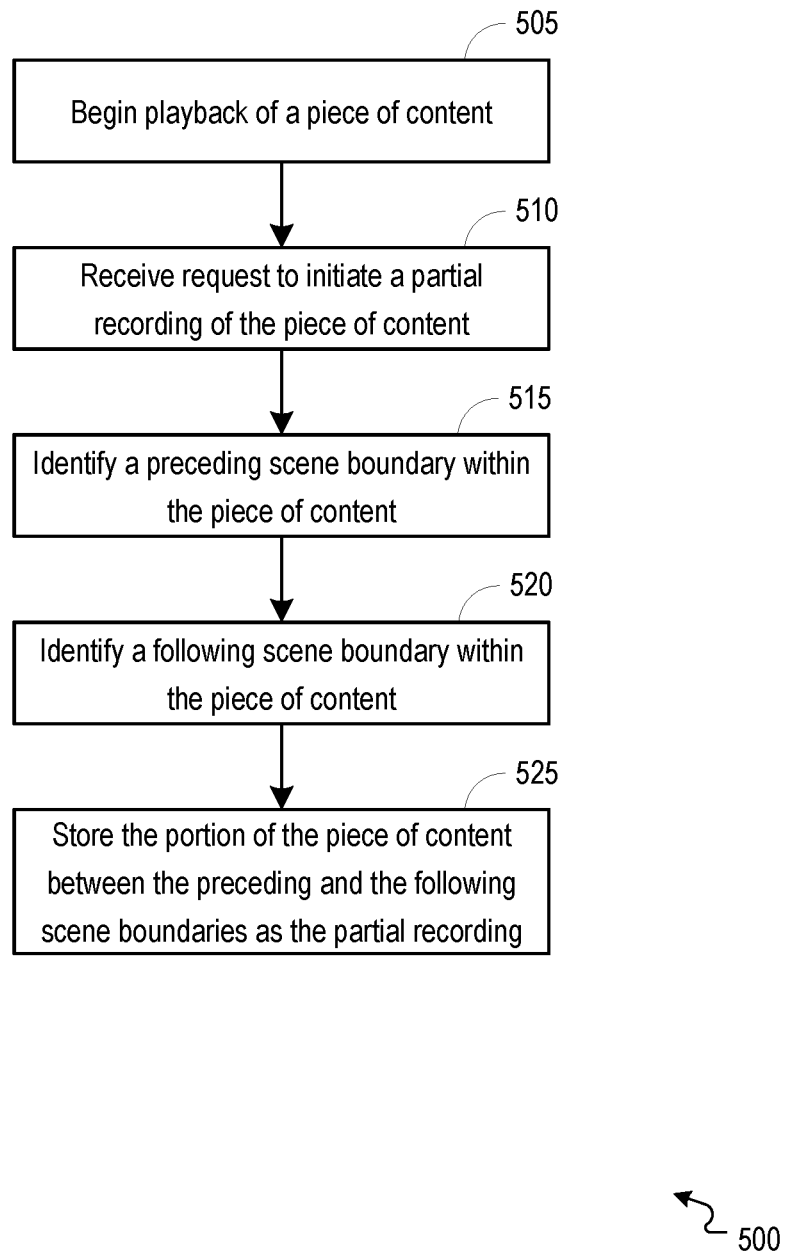
FIG. 5 is a flowchart illustrating an example process operable to facilitate the creation of a personalized partial recording based on an identification of one or more scene boundaries.

FIG. 5 is a flowchart illustrating an example process 500 operable to facilitate the creation of a personalized partial recording based on an identification of one or more scene boundaries. The process 500 may begin at 505 when playback of a piece of content is initiated. The piece of content may be linear multimedia content (e.g., live television) received at a multimedia device 110 of FIG. 1, recorded multimedia content received at the multimedia device 110 (e.g., VoD content, nDVR content, etc.), or recorded multimedia content stored at the multimedia device 110 (e.g., DVR content stored at content storage 210 of FIG. 2). Playback of the piece of content may be initiated by a playback request received from a display device connected to or otherwise associated with the multimedia device 110 (e.g., client device 120 of FIG. 1).

At 510, a request to initiate a partial recording of the piece of content may be received. The request to initiate a partial recording of the content may be received at the multimedia device 110 (e.g., at a partial recording module 225 of FIG. 2). In embodiments, the request to initiate a partial recording may include a signal received at the multimedia device 110 from a control unit (e.g., remote control unit (RCU)). For example, while outputting a piece of content to a device, the multimedia device 110 (e.g., the partial recording module 225) may recognize a predetermined command as a request to initiate a partial recording. The predetermined command may be transmitted from a RCU in response to a depressing of a button designated for the initiation of a partial recording. The button designated for the initiation of a partial recording may be a unique button (e.g., 'Partial Recording' button) or may be a button having one or more other functions (e.g., a 'Record' button).

At 515, a preceding scene boundary within the piece of content may be identified. The preceding scene boundary may be identified, for example, by a partial recording module 225 of FIG. 2. In embodiments, content received at a multimedia device 110 of FIG. 1 may include a plurality of scenes separated by one or more scene boundaries. The content may be received at the multimedia device 110 as packets or frames and may carry information identifying the location of scene boundaries within the content, or the multimedia device 110 may identify and mark scene boundaries (e.g., a scene change module 230 of FIG. 2 may identify and mark scene boundaries) within a received piece of content. The multimedia device 110 may output content and store content carrying the information (e.g., as metadata) that identifies the locations of scene boundaries within the content. The partial recording module 225 may search previously received packets or frames for an identification of the location of a first preceding scene boundary. For example, the partial recording module 225 may search packets or frames held in temporary storage (e.g., buffers such as LOD buffers) or packets or frames stored as a recording (e.g., packets/frames stored at content storage 210) for information identifying a prior scene change. It will be appreciated by those skilled in the relevant art that scene change information may be carried and delivered to the multimedia device 110 in various formats and using various protocols.

At 520, a following scene boundary within the piece of content may be identified. The following scene boundary may be identified, for example, by the partial recording module 225 of FIG. 2. In embodiments, the partial recording module 225 may monitor frames or packets received as part of the piece of content and the partial recording module 225 may detect and process information serving to identify a next scene boundary. When the piece of content is a recording stored at the multimedia device 110, the partial recording module 225 may search the frames or packets making up the stored recording for information that identifies a scene boundary occurring immediately after the identified preceding scene boundary.

At 525, the portion of the piece of content between the preceding scene boundary and the following scene boundary may be stored as the partial recording. The portion of the piece of content between the preceding scene boundary and the following scene boundary may be stored, for example, at the content storage 210 of FIG. 2. The partial recording may be stored at the content storage 210 as a recording that is separate from the original piece of content. In embodiments, the partial recording module 225 may perform a recording or copy operation on one or more portions of the piece of content that are temporarily stored at one or more buffers (e.g., LOD buffers). The portions of the piece of content identified for storing as the partial recording may be copied from the one or more buffers to content storage 210 and may be stored as a scene associated with the original piece of content. The stored partial recording may include other information associated with the partial recording (e.g., information identifying the associated original piece of content, duration information, start and termination points, date/time of creation, etc.) and/or information serving to identify a device responsible for creating the partial recording. For example, the recording may include an identifier of the client device 120 that requested an initiation of the partial recording.

Figure 6:
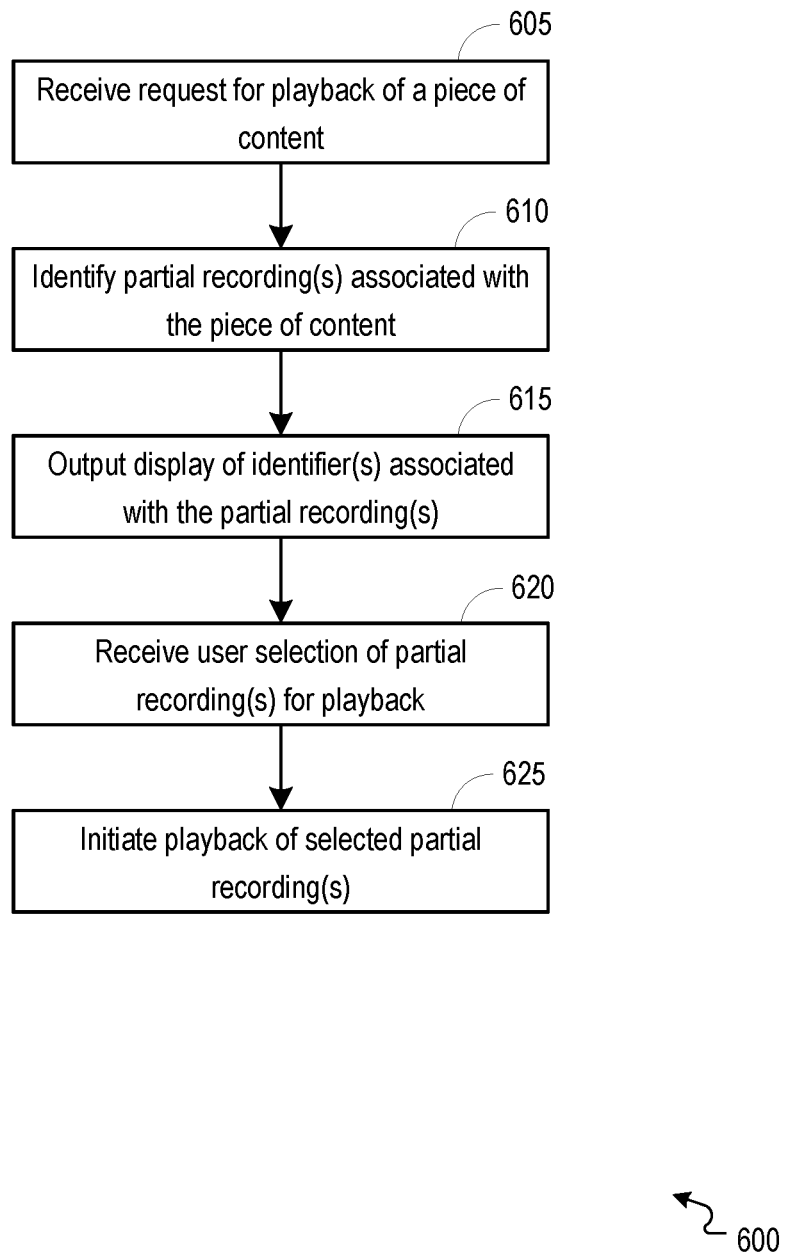
FIG. 6 is a flowchart illustrating an example process operable to present a user interface showing one or more partial recordings associated with a piece of content.

FIG. 6 is a flowchart illustrating an example process 600 operable to present a user interface showing one or more partial recordings associated with a piece of content. The process 600 may begin at 605 when a request for playback of a piece of content is received. A request for playback of a piece of content may be received from a device (e.g., client device 120 of FIG. 1) at a multimedia device 110 of FIG. 1. The content requested for playback may be linear multimedia content (e.g., live television) received at a multimedia device 110 of FIG. 1, recorded multimedia content received at the multimedia device 110 (e.g., VoD content, nDVR content, etc.), or recorded multimedia content stored at the multimedia device 110 (e.g., DVR content stored at content storage 210 of FIG. 2). The content may be presented to a user as a content identifier within a menu, guide, application interface, or other user interface.

At 610, one or more partial recordings associated with the piece of content may be identified. The one or more partial recordings may be identified, for example, by a partial recording module 225 of FIG. 2. In embodiments, partial recordings may be stored within content storage 210 of FIG. 2 and may include information identifying an association with an original piece of content (e.g., metadata, naming convention, or other information may serve as an indication of a partial recording's association with an original piece of content). The partial recording module 225 may search for and identify one or more partial recordings stored within the content storage 210 that are associated with the piece of content requested for playback.

At 615, a display including one or more identifiers of the one or more identified partial recordings may be output. The display may be output, for example, by the partial recording module 225 to a display device (e.g., client device 120 of FIG. 1). In embodiments, the one or more identifiers may include text identifying the partial recording as a partial recording of the original piece of content, and may include other identification information (e.g., a unique name given to the partial recording, an identification of the user or client device 120 that initiated recording of the partial recording, etc.). The one or more identifiers may be displayed within a menu or guide interface. In embodiments, the displayed partial recording identifiers may include only those identifiers associated with partial recordings that were generated in response to a request received from the same client device as the client device to which the display is being output.

At 620, a user selection of one or more partial recordings may be received. A user may select one or more partial recordings for playback, and the user selection may be received at the multimedia device 110 and may be detected by the partial recording module 225. In embodiments, a user may select one or more partial recordings from one or more partial recording identifiers displayed within a menu or guide that is presented to the user.

At 625, playback of the selected partial recording(s) may be initiated. Playback of the selected partial recording(s) may be initiated, for example, by the partial recording module 225, and the recording(s) may be output from a multimedia device 110 to a requesting client device 120. In embodiments, a user may select an original piece of content (e.g., non-partial recording), and the partial recording module 225 may initiate playback and delivery of all of the stored partial recordings associated with the original piece of content to the requesting client device 120. In embodiments, when a request for playback of an original piece of content (e.g., non-partial recording) is received at a multimedia device 110 from a client device 120, the multimedia device 110 may output to the client device 120, all of the partial recordings that are associated with both the original piece of content and the requesting client device 120. For example, the multimedia device 110 may output the partial recordings that are associated with the original piece of content and that were initiated in response to a request received from the client device 120.

Figure 7:
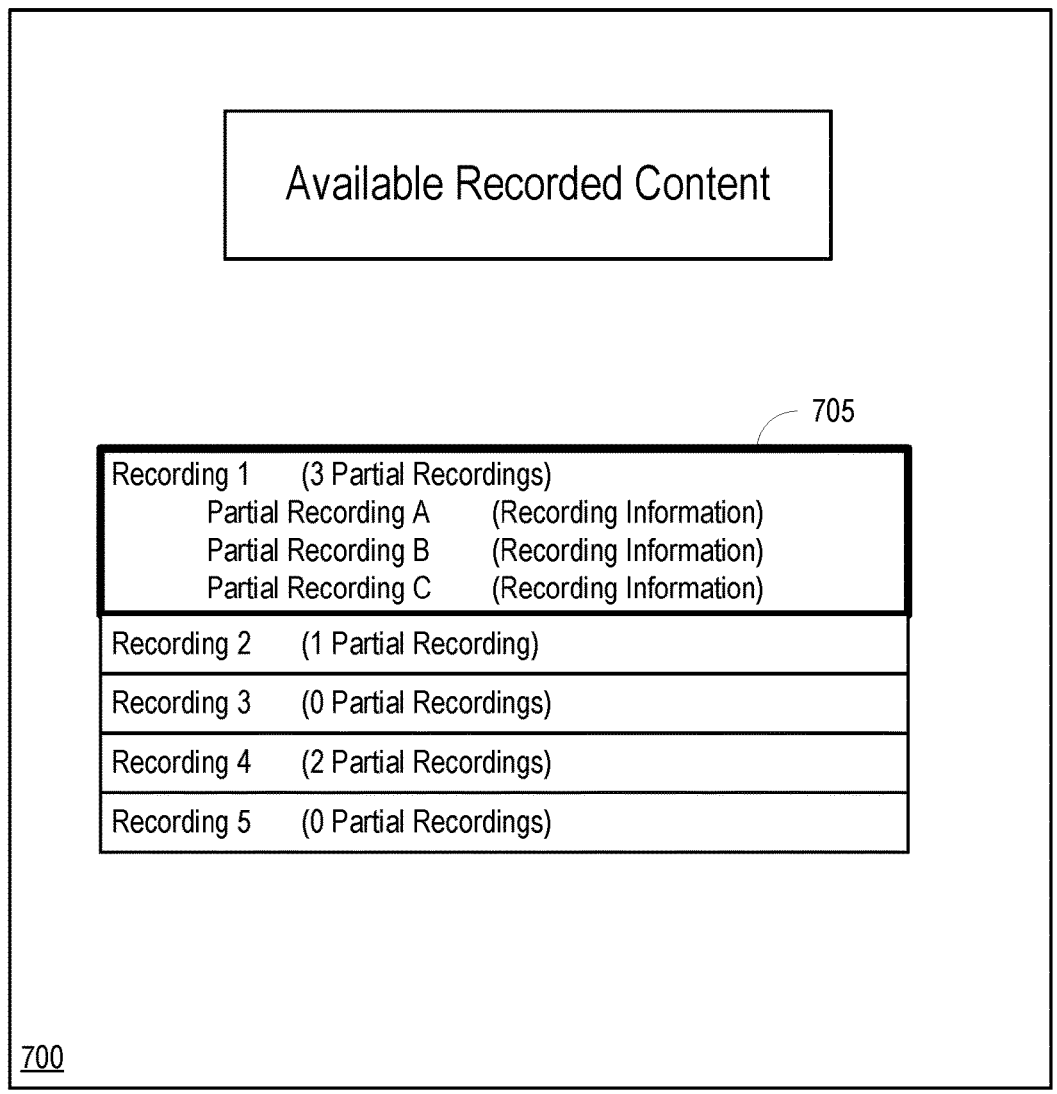
FIG. 7 is an illustration of an example interface including a display identifying one or more partial recordings associated with one or more original pieces of content.

FIG. 7 is an illustration of an example interface 700 including a display 705 identifying one or more partial recordings associated with one or more original pieces of content. In embodiments, the display 705 may include a plurality of titles (e.g., 'Recording 1,' 'Recording 2,' ... 'Recording 5'), each title identifying a recording available for playback. The recordings may include recordings stored at a multimedia device 110 of FIG. 1, recordings stored at another storage device, or linear content received at a multimedia device 110. Each recording entry may further include an identification of the number of partial recordings that are available for the corresponding primary or original recording (e.g., '1 Partial Recording,' '2 Partial Recordings,' etc.).

When a recording or recording title is selected for playback or closer inspection (e.g., as is 'Recording 1'), identifiers or titles of one or more partial recordings (e.g., 'Partial Recording A,' Partial Recording B,' 'Partial Recording C,' etc.) associated with the selected recording may be displayed within the display 705. For example, the partial recording identifiers or titles may be displayed within a display window or box associated with the selected recording. Additional information (e.g., 'Recording Information') associated with a partial recording may be displayed along with the partial recording title or identifier. For example, additional information associated with a partial recording may include an identification of a user or device (e.g., client device 120 of FIG. 1) that requested or otherwise initiated the generation of the partial recording, a duration of the partial recording, a start/end point associated with the partial recording, a summary of the scene(s) captured within the partial recording, and other information.

In embodiments, a user may select one or more partial recordings from the display 705 for playback at a display device (e.g., display connected to a multimedia device 110 of FIG. 1 or client device 120 of FIG. 1 associated with a multimedia device 110) or synchronization to a display device. The user may select a single partial recording for playback or may select a plurality of partial recordings for playback. For example, a user may choose an option to have all, or a selected plurality, of the partial recordings associated with the selected recording delivered to a device for playback, or the user may choose an option to have delivered to a device for playback, all, or a selected plurality, of the partial recordings that are both associated with the selected recoding and that were created in response to a request received from a specific device (e.g., client device 120).

Figure 8:
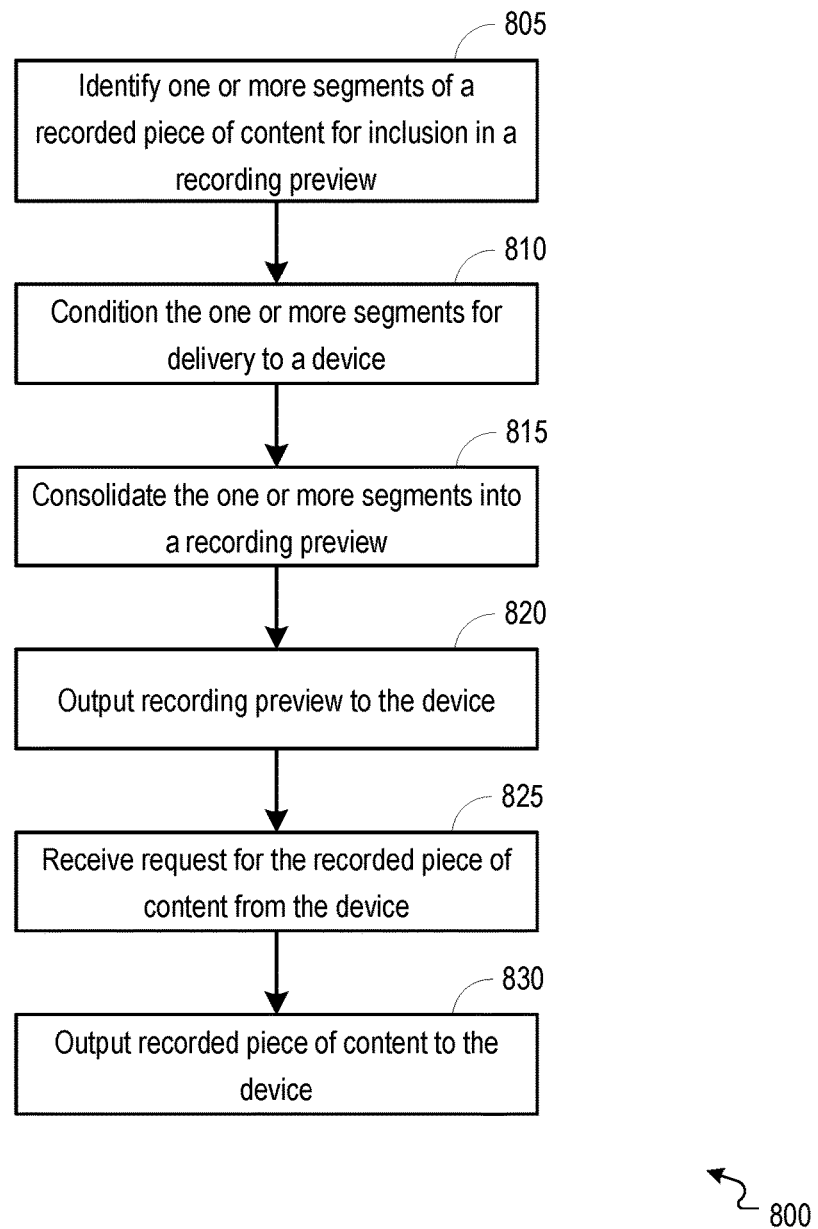
FIG. 8 is a flowchart illustrating an example process operable to generate a preview of a recorded piece of content for output to a device.

FIG. 8 is a flowchart illustrating an example process 800 operable to generate a preview of a recorded piece of content for output to a device. The process 800 may begin at 805 when one or more segments of a recorded piece of content are identified for inclusion in a recording preview. One or more segments may be identified for inclusion in a recording preview, for example, by the partial recording module 225 of FIG. 2. The one or more segments may be identified when a piece of content is being recorded at a device (e.g., DVR or STB such as a multimedia device 110 of FIG. 1) or when a recorded piece of content is being conditioned or transcoded in preparation of a delivery of the content to a display device (e.g., client device 120 of FIG. 1). In embodiments, a piece of content may be selected for generation of a recording preview based on a user request or a predictive algorithm. For example, a user may configure a recording device (e.g., multimedia device 110) to prepare recording previews for certain content (e.g., certain programs, programs from a certain channel, programs of a certain genre, etc.), and the recording device may be configured to identify content for which to prepare recording previews based on recording or synchronization tendencies observed by the recording device (e.g., an identification of certain programs, channels, genres, etc. that are commonly requested for delivery or synchronization to associated devices).

In embodiments, the recording device (e.g., multimedia device 110) may identify one or more segment start points at predetermined intervals within the recorded piece of content. The predetermined intervals may be based on various factors including length of the recorded piece of content, number of segments to be identified, targeted duration of the recording preview, and others. For example, the recording device may be configured to determine a number of segments to identify based on the length of the recorded piece of content (i.e., the number of segments to identify may be directly correlated with the length of the recorded piece of content), and the start points of each segment may be spread evenly or randomly across the recorded piece of content. The recording device may identify an end point for each segment, wherein the end point is identified based on a predetermined duration for each segment. In embodiments, the predetermined duration for each segment may be based upon a targeted recording preview duration and the number of segments identified. For example, the predetermined duration for each segment may be equivalent to the targeted recording preview duration divided by the number of segments identified.

At 810, each of the one or more identified segments may be conditioned for delivery to a device. The identified segment(s) may be conditioned for delivery, for example, by a content conditioning module 235 of FIG. 2. In embodiments, the content conditioning module 235 may condition the identified segment(s) according to one or more formatting, playback, and/or delivery requirements associated with the device (e.g., client device 120 of FIG. 1), thereby creating a conditioned version of the one or more identified segments that is suitable for delivery to the device. It should be understood that the content conditioning module 235 may condition the identified segment(s) for delivery to a plurality of different devices, wherein a conditioned version of the segment(s) is created for each device based on formatting, playback, and/or delivery requirements associated with the respective device.

At 815, the one or more conditioned segments may be consolidated into a recording preview. The one or more conditioned segments may be consolidated into a recording preview, for example, by the partial recording module 225 of FIG. 2. The recording preview may be stored at the multimedia device 110 (e.g., at content storage 210 of FIG. 2) and may include information identifying the associated recorded piece of content, a user or device for which the recording preview was conditioned, and other information.

At 820, the recording preview may be output to the device. The recording preview may be output from the multimedia device 110 to the device (e.g., client device 120) over a wired or wireless connection (e.g., through the client interface 215 of FIG. 2). In embodiments, the recording preview may be streamed to the device for playback at the device, or the recording preview may be delivered to the device through a synchronization operation for a later playback of the recording preview. The recording preview may be output to the device as soon as the recording preview is conditioned and prepared for delivery by the multimedia device 110, at a scheduled time, or in response to a request for the recording preview received from the device. It should be understood that the recording preview may be output to a plurality of different devices.

At 825, a request for the recorded piece of content associated with the recording preview may be received from the device. In embodiments, after receiving the recording preview at a device, a user may decide to request delivery of the entire recorded piece of content associated with the recording preview. For example, the user may request delivery (e.g., via streaming or synchronization process) of the entire recorded piece of content.

At 830, the entire recorded piece of content may be output to the requesting device. The recorded piece of content may be output from content storage 210 or other storage to the device. For example, the recorded piece of content may be transcoded or conditioned (e.g., by the content conditioning module 235 of FIG. 2) for delivery to the device via a streaming or synchronization process.

Figure 9:
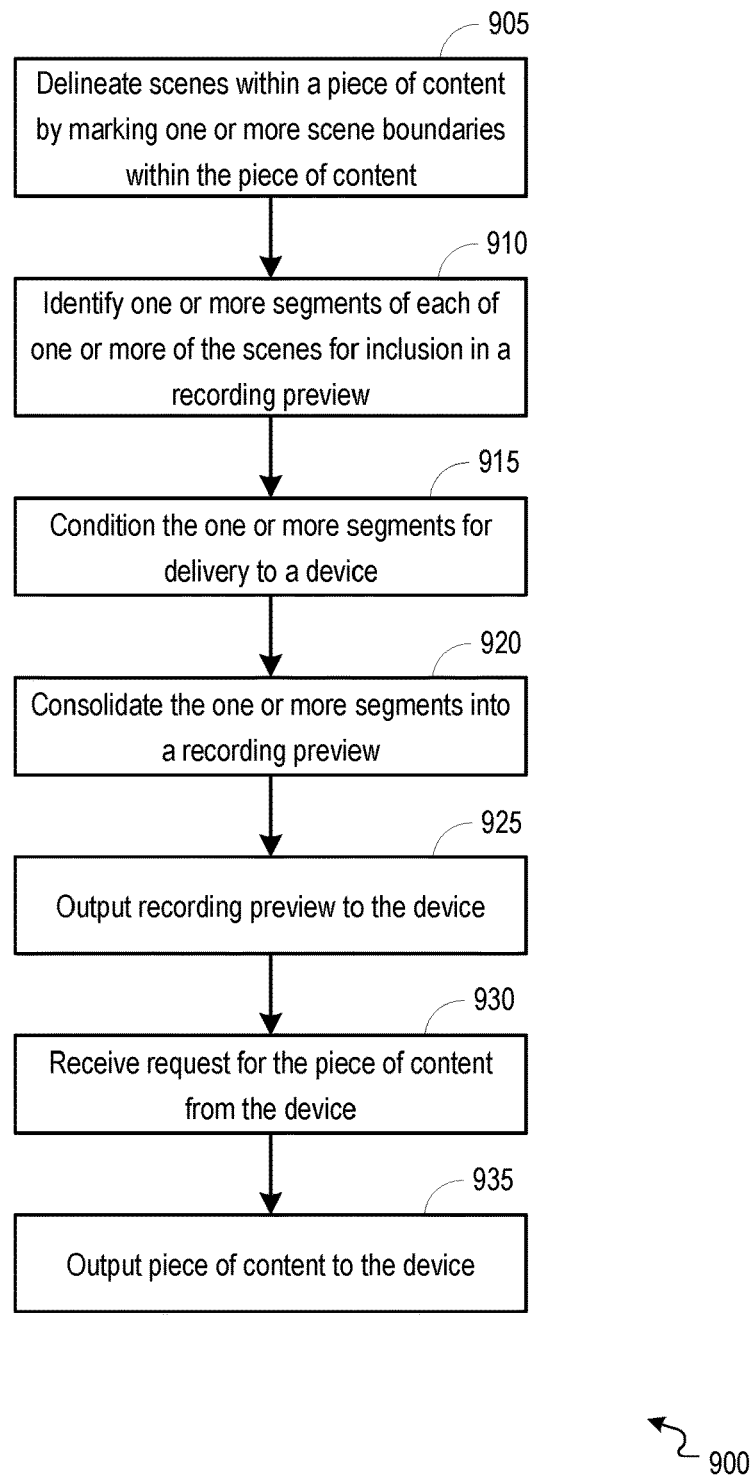
FIG. 9 is a flowchart illustrating an example process operable to generate a preview of a piece of content based on scene boundaries identified within the piece of content.

FIG. 9 is a flowchart illustrating an example process 900 operable to generate a preview of a piece of content based on scene boundaries identified within the piece of content. The process 900 may begin at 905 when scenes within a piece of content are delineated by marking one or more scene boundaries within the piece of content. Scene boundaries within a piece of content may be identified and marked by a multimedia device 110 of FIG. 1 (e.g., by a scene change module 230 of FIG. 2) receiving, recording, and/or transcoding the piece of content. In embodiments, the scene change module 230 may detect and mark scene boundaries within the piece of content during a recording, a transcoding, or a playback of the piece of content. For example, scene boundaries may be identified from scene meta-data carried by one or more packets or frames of the content or may be detected and marked using scene change detection hardware or software at the multimedia device 110. Scene boundaries may be identified and/or marked using a frame offset value identifying the position of a first frame of a scene within the content.

At 910, one or more segments of each of one or more of the delineated scenes may be identified for inclusion in a recording preview. One or more segments may be identified for inclusion in a recording preview, for example, by the partial recording module 225 of FIG. 2. The one or more segments may be identified when a piece of content is being recorded at a device (e.g., DVR or STB such as a multimedia device 110 of FIG. 1) or when a recorded piece of content is being conditioned or transcoded in preparation of a delivery of the content to a display device (e.g., client device 120 of FIG. 1). In embodiments, a piece of content may be selected for generation of a recording preview based on a user request or a predictive algorithm. For example, a user may configure a recording device (e.g., multimedia device 110) to prepare recording previews for certain content (e.g., certain programs, programs from a certain channel, programs of a certain genre, etc.), the recording device may be configured to identify content for which to prepare recording previews based on recording or synchronization tendencies observed by the recording device (e.g., an identification of certain programs, channels, genres, etc. that are commonly requested for delivery or synchronization to associated devices).

In embodiments, the recording device (e.g., multimedia device 110) may identify one or more segments within each of the delineated scenes of the content or within a random or ordered selection of less than all of the delineated scenes of the content. The multimedia device 110 may be configured to determine a number of segments to identify based on the length of the piece of content (i.e., the number of segments to identify may be directly correlated with the length of the piece of content) and/or the number of delineated scenes within the piece of content. For example, a start point of each segment may be a start point of each of one or more scenes identified for inclusion in the recording preview. The multimedia device 110 may be configured to determine a duration for each segment, wherein the determination of each segment duration is based on a targeted recording preview duration (e.g., one, two, three minutes, etc.) and the number of delineated scenes within the piece of content, the number of segments identified, the length of the piece of content, or other property of the piece of content.

At 915, each of the one or more identified segments may be conditioned for delivery to a device. The identified segment(s) may be conditioned for delivery, for example, by a content conditioning module 235 of FIG. 2. In embodiments, the content conditioning module 235 may condition the identified segment(s) according to one or more formatting, playback, and/or delivery requirements associated with the device (e.g., client device 120 of FIG. 1), thereby creating a conditioned version of the one or more identified segments that is suitable for delivery to the device. It should be understood that the content conditioning module 235 may condition the identified segment(s) for delivery to a plurality of different devices, wherein a conditioned version of the segment(s) is created for each device based on formatting, playback, and/or delivery requirements associated with the respective device.

At 920, the one or more conditioned segments may be consolidated into a recording preview. The one or more conditioned segments may be consolidated into a recording preview, for example, by the partial recording module 225 of FIG. 2. The recording preview may be stored at the multimedia device 110 (e.g., at content storage 210 of FIG. 2) and may include information identifying the associated piece of content, a user or device for which the recording preview was conditioned, and other information.

At 925, the recording preview may be output to the device. The recording preview may be output from the multimedia device 110 to the device (e.g., client device 120) over a wired or wireless connection (e.g., through the client interface 215 of FIG. 2). In embodiments, the recording preview may be streamed to the device for playback at the device, or the recording preview may be delivered to the device through a synchronization operation for a later playback of the recording preview. The recording preview may be output to the device as soon as the recording preview is conditioned and prepared for delivery by the multimedia device 110, at a scheduled time, or in response to a request for the recording preview received from the device. It should be understood that the recording preview may be output to a plurality of different devices.

At 930, a request for the piece of content associated with the recording preview may be received from the device. In embodiments, after receiving the recording preview at a device, a user may decide to request delivery of the entire piece of content associated with the recording preview. For example, the user may request delivery (e.g., via streaming or synchronization process) of the entire piece of content.

At 935, the entire piece of content may be output to the requesting device. The piece of content may be output from content storage 210 or other storage to the device. For example, the piece of content may be transcoded or conditioned (e.g., by the content conditioning module 235 of FIG. 2) for delivery to the device via a streaming or synchronization process.

Figure 10:
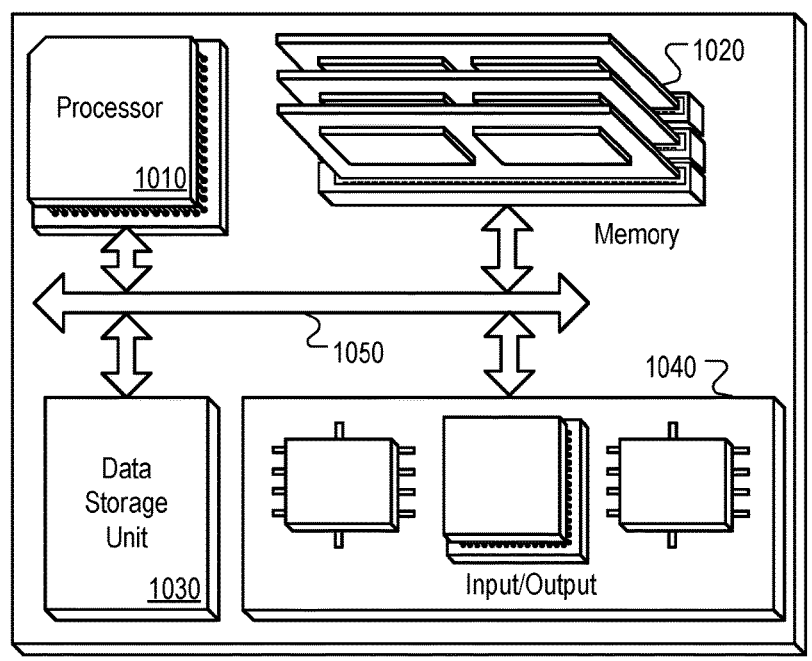
FIG. 10 is a block diagram of a hardware configuration operable to facilitate the creation of personalized partial recordings of multimedia content.

FIG. 10 is a block diagram of a hardware configuration 1000 operable to facilitate the creation of personalized partial recordings of multimedia content. The hardware configuration 1000 can include a processor 1010, a memory 1020, a storage device 1030, and an input/output device 1040. Each of the components 1010, 1020, 1030, and 1040 can, for example, be interconnected using a system bus 1050. The processor 1010 can be capable of processing instructions for execution within the hardware configuration 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

The memory 1020 can store information within the hardware configuration 1000. In one implementation, the memory 1020 can be a computer-readable medium. In one implementation, the memory 1020 can be a volatile memory unit. In another implementation, the memory 1020 can be a non-volatile memory unit.

In some implementations, the storage device 1030 can be capable of providing mass storage for the hardware configuration 1000. In one implementation, the storage device 1030 can be a computer-readable medium. In various different implementations, the storage device 1030 can, for example, include a hard disk device, an optical disk device, flash memory or some other large capacity storage device. In other implementations, the storage device 1030 can be a device external to the hardware configuration 1000.

The input/output device 1040 provides input/output operations for the hardware configuration 1000. In one implementation, the input/output device 1040 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a central or access device (e.g., multimedia device 110 of FIG. 1 such as an access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein improves upon methods and systems for generating partial recordings of content. Methods, systems, and computer readable media may be operable to facilitate the creation of personalized partial recordings of multimedia content. A partial recording of a piece of content may be created based upon a user request being received at a multimedia device and a determination of partial recording start and termination points. In embodiments, the start point of a partial recording may be based upon a predetermined or user-input setback duration, or a preceding scene boundary may be identified as the partial recording start point. A partial recording may include a content preview comprising one or more portions of one or more content segments, and each of the one or more content segments may include a start point that is identified within the associated piece of content based upon a predetermined interval or an identification of scene boundaries within the content.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a request to create a partial recording of a piece of content, wherein the request to create the partial recording is received at a set-top box during playback of the piece of content, and wherein the request to create the partial recording is received as a wireless signal from a remote control unit, the wireless signal being output from the remote control unit in response to a depressing of a button designated for initiating a creation of a partial recording;
   in response to the request being received, marking a current read position within the piece of content;
   identifying from within the piece of content, a start point for the partial recording, wherein the start point for the partial recording is identified in relation to the current read position that is marked within the piece of content, wherein the start point is identified in response to the request to create the partial recording and without further instructions from a user, wherein the start point for the partial recording is identified based upon a location of the current read position within the piece of content, wherein identifying the start point for the partial recording comprises:
      identifying a scene boundary preceding the current read position that is marked within the piece of content; and
      identifying as the start point for the partial recording, the identified scene boundary preceding the current read position that is marked within the piece of content;
   identifying from within the piece of content, a termination point for the partial recording, wherein a next scene boundary following the scene boundary preceding the current read position is identified as the termination point for the partial recording; and
   copying the portion of the piece of content between the start point and the termination point as the partial recording, wherein the portion of the piece of content is copied from a live off disk buffer;
   tagging the partial recording with a unique identifier associated with the set-top box; and
   storing the partial recording.

2. The method of claim 1, wherein:
   the piece of content comprises a recorded piece of content; and
   the start point comprises the current read position that is marked within the piece of content.

3. The method of claim 1, wherein:
   the start point comprises a point in the piece of content that is prior to the current read position that is marked within the piece of content; and
   the start point is identified based upon an identified setback duration.

4. The method of claim 3, wherein the identified setback duration comprises a duration of time that is received as input from a user.

5. The method of claim 1, wherein the scene boundary preceding the current read position that is marked within the piece of content is identified using a scene change detection algorithm.

6. The method of claim 1, further comprising:
   identifying one or more other start points within the piece of content, and for each respective one of the one or more other start points, identifying a corresponding termination point, thereby creating a plurality of partial recording segments, each respective partial recording segment comprising the portion of the piece of content between a respective start point and a respective termination point; and consolidating the partial recording segments to create the partial recording.

7. The method of claim 6, wherein each respective one of the plurality of start points comprises a scene boundary.

8. The method of claim 6, further comprising:
conditioning the partial recording, wherein conditioning the partial recording comprises transcoding the partial recording to create a conditioned version of the partial recording that may be delivered to and processed for playback by a target client device; and
outputting the conditioned version of the partial recording to the target client device.

9. A set-top box that:
receives a request to create a partial recording of a piece of content, wherein the request to create the partial recording is received during playback of the piece of content, and wherein the request to create the partial recording is received as a wireless signal from a remote control unit, the wireless signal being output from the remote control unit in response to a depressing of a button designated for initiating a creation of a partial recording;
in response to the request being received, marks a current read position within the piece of content;
identifies from within the piece of content, a start point for the partial recording, wherein the start point for the partial recording is identified in relation to the current read position that is marked within the piece of content, wherein the start point is identified in response to the request to create the partial recording and without further instructions from a user, wherein the start point for the partial recording is identified based upon a location of the current read position within the piece of content, wherein identifying the start point for the partial recording comprises:
identifying a scene boundary preceding the current read position that is marked within the piece of content; and
identifying as the start point for the partial recording, the identified scene boundary preceding the current read position that is marked within the piece of content;
identifies from within the piece of content, a termination point for the partial recording, wherein a next scene boundary following the scene boundary preceding the current read position is identified as the termination point for the partial recording; and
copies the portion of the piece of content between the start point and the termination point as the partial recording, wherein the portion of the piece of content is copied from a live off disk buffer;
tags the partial recording with a unique identifier associated with the set-top box; and
stores the partial recording.

10. The set-top box of claim 9, wherein:
the piece of content comprises a recorded piece of content; and
the start point comprises the current read position that is marked within the piece of content.

11. The set-top box of claim 9, wherein:
the start point comprises a point in the piece of content that is prior to the current read position that is marked within the piece of content; and
the start point is identified based upon an identified setback duration.

12. The set-top box of claim 9, wherein the set-top box further:
identifies one or more other start points within the piece of content, wherein each respective one of the plurality of start points comprises a scene boundary, and for each respective one of the one or more other start points, identify a corresponding termination point, thereby creating a plurality of partial recording segments, each respective partial recording segment comprising the portion of the piece of content between a respective start point and a respective termination point; and
consolidates the partial recording segments to create the partial recording.

13. One or more non-transitory computer readable media having instructions operable to cause one or more processors to perform the operations comprising:
receiving a request to create a partial recording of a piece of content, wherein the request to create the partial recording is received during playback of the piece of content, and wherein the request to create the partial recording is received as a wireless signal from a remote control unit, the wireless signal being output from the remote control unit in response to a depressing of a button designated for initiating a creation of a partial recording;
in response to the request being received, marking a current read position within the piece of content;
identifying from within the piece of content, a start point for the partial recording, wherein the start point for the partial recording is identified in relation to the current read position that is marked within the piece of content, wherein the start point is identified in response to the request to create the partial recording and without further instructions from a user, wherein the start point for the partial recording is identified based upon a location of the current read position within the piece of content, wherein identifying the start point for the partial recording comprises:
identifying a scene boundary preceding the current read position that is marked within the piece of content; and
identifying as the start point for the partial recording, the identified scene boundary preceding the current read position that is marked within the piece of content;
identifying from within the piece of content, a termination point for the partial recording, wherein a next scene boundary following the scene boundary preceding the current read position is identified as the termination point for the partial recording; and
copying the portion of the piece of content between the start point and the termination point as the partial recording, wherein the portion of the piece of content is copied from a live off disk buffer;
tagging the partial recording with a unique identifier associated with the set-top box; and
storing the partial recording.

14. The one or more non-transitory computer-readable media of claim 13, wherein:
the piece of content comprises a recorded piece of content; and
the start point comprises the current read position that is marked within the piece of content.

15. The one or more non-transitory computer-readable media of claim 13, wherein:

the start point comprises a point in the piece of content that is prior to the current read position that is marked within the piece of content; and the start point is identified based upon an identified setback duration.

16. The one or more non-transitory computer-readable media of claim 13, wherein the instructions are further operable to cause one or more processors to perform the operations comprising:

identifying one or more other start points within the piece of content, and for each respective one of the one or more other start points, identifying a corresponding termination point, thereby creating a plurality of partial recording segments, each respective partial recording segment comprising the portion of the piece of content between a respective start point and a respective termination point; and consolidating the partial recording segments to create the partial recording.

17. The one or more non-transitory computer-readable media of claim 16, wherein each respective one of the plurality of start points comprises a scene boundary.

* * * * *